Figure 1:
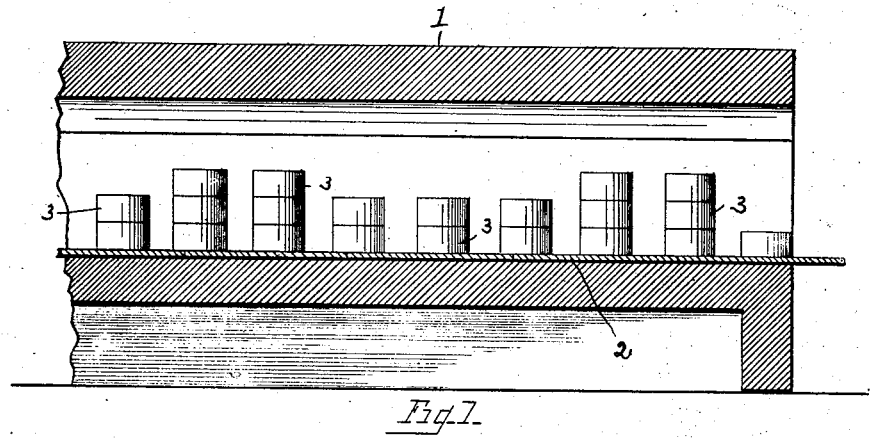

(No Model.)

M. J. OWENS.
RECEPTACLE FOR LEERS OR ANNEALING OVENS.

No. 506,719. Patented Oct. 17, 1893.

WITNESSES
Carroll J. Webster
Grace E. Lehaney

INVENTOR
Michael J. Owens
By William Webster
Atty

UNITED STATES PATENT OFFICE.

MICHAEL JOSEPH OWENS, OF FINDLAY, ASSIGNOR TO THE LIBBEY GLASS COMPANY, OF TOLEDO, OHIO.

RECEPTACLE FOR LEERS OR ANNEALING-OVENS.

SPECIFICATION forming part of Letters Patent No. 506,719, dated October 17, 1893.

Application filed July 5, 1892. Serial No. 438,889. (No model.)

*To all whom it may concern:*

Be it known that I, MICHAEL JOSEPH OWENS, of Findlay, county of Hancock, and State of Ohio, have invented certain new and useful Improvements in Receptacles for Leers or Annealing-Ovens; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a supplemental receptacle for leers or annealing ovens, and has for its object to improve the existing manner of annealing glassware.

Heretofore in annealing glassware, the ware is taken by the operative across the factory floor to the leer and is passed therethrough and annealed, but in this operation there are a great many existing defects, which results in a breakage of a large percentage of the ware. In the first place in carrying the ware from the finisher to the leer the temperature of the same is lowered making the ware liable to crack, also owing to the varying temperatures to which the ware is subjected making it brittle and worthless. The same difficulty is also found in the leer, owing to the change due to drafts, &c., and changes in the leer fire. Another defect is found in the cooling of the ware in the exit end of the leer, as when the ware is taken from the leer in a very hot condition, as would be the case if the draft of air in the leer is from the entrance end to the exit. Then the heat is all contracted in the exit end. This fact causes the ware to be quickly and improperly handled, and also causes a too rapid cooling of the same after it leaves the leer causing the ware to crack or become brittle and consequently worthless. This same defect is encountered when the ware is passed through the leer with any rapidity as would be the case when a large order is to be filled.

It is the object of my invention to overcome these objections, and I accomplish this result by employing an annealing receptacle which is so constructed as to hold the heat of the ware as it leaves the finisher and properly heat and anneal the ware in the leer, and when taken from the leer gradually allowing the ware to cool off without exposure to the outside atmosphere.

The invention further consists in forming the receptacles in such a way that they can be arranged in tiers in the leer, thereby allowing for a larger output of annealed ware with the ordinary feed of leer plate and consequently a longer heating time for the ware to properly anneal the same.

In the drawings I have illustrated one form of receptacle as diagrammatic of my invention and in which—

Figure 2:
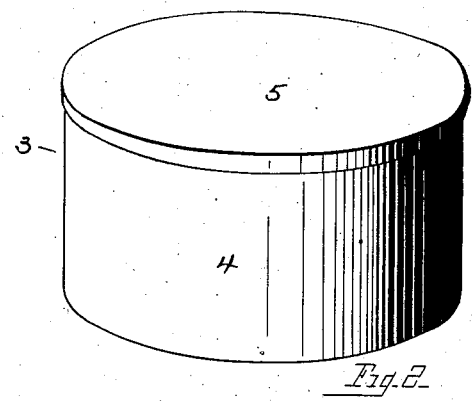
Figure 3:
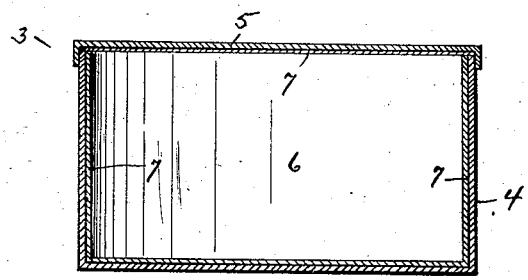

Figure 1 is a longitudinal vertical sectional view of the leer illustrating the leer plate and receptacles containing the ware resting thereon, showing how the same may be arranged to insure a greater output of ware with the same speed of feed and consequently heat as heretofore. Fig. 2 is a perspective view of the supplemental kiln or receptacle and Fig. 3 is a vertical section of the same.

1 designates the leer, and 2 the leer plate, which are of any form or construction, and not being a part of this invention need no further description.

3 designates the supplemental receptacle which is formed of the box 4, preferably of metal over which fits the top 5 forming an inclosed space 6, there being a lining 7 of non-conducting and heat retaining properties in the interior of the receptacle for a purpose to be hereinafter stated.

In operation, as the ware is finished it is placed in the receptacle which can be made of any shape suitable either to suit the size and shape of the ware, as would be the case if only one kind of ware was being made, or of a size to contain any shape of ware if so desired. The top 5 is then placed thereon and the annealing receptacle is taken to the leer to be annealed, and is run through the leer on the leer plate 2 as heretofore.

It will be understood that by the use of the annealing receptacle the heat of the ware is retained in the same by reason of the inclosing sides, this operation being made even more positive by the non-conducting and heat retaining material 7, preferably of asbestus. Therefore, the temperature of the ware is not lowered in transit to the leer as heretofore. Also in passing through the leer the ware receives an even heat notwithstanding the changes of the leer fire, as the heat received is retained and the ware is not subject to a sudden rise or fall of its temperature which causes the breakage. It will also be seen that by reason of the flat top and bottom of the annealing receptacle the same can be packed above each other in the leer thereby increasing the capacity of the leer to a great extent. It will also be seen that by leaving the ware in the kilns after passing through the leer the same will be cooled gradually thereby making the process of annealing glass practically perfect.

While I have described the annealing receptacle as receiving its heat from passing through the leer, I may employ other means for heating the same, without departing from the spirit of my invention.

What I claim is—

The combination with the furnace, having a flat plate, of an annealing receptacle adapted to receive a glass article, said receptacle having a non-conducting and non-combustible lining to prevent sudden changes of the temperature, and a flat top and bottom, whereby the receptacles can be slipped along and packed on top of one another.

In testimony that I claim the foregoing as my own I hereby affix my signature in presence of two witnesses.

MICHAEL JOSEPH OWENS.

Witnesses:
LOUIS A. CARABIN,
JOSEPH STACKHOUS.